B. HALL.
MACHINE FOR COVERING INNERSOLES OF THE GEM TYPE.
APPLICATION FILED JAN. 6, 1915.

1,160,711.

Patented Nov. 16, 1915.
2 SHEETS—SHEET 1.

Witnesses:
Ernest A. Telfer
J. Murphy

Inventor:
Bicknell Hall
by Jas. H. Churchill
Atty.

B. HALL.
MACHINE FOR COVERING INNERSOLES OF THE GEM TYPE.
APPLICATION FILED JAN. 6, 1915.
1,160,711.
Patented Nov. 16, 1915.
2 SHEETS—SHEET 2.
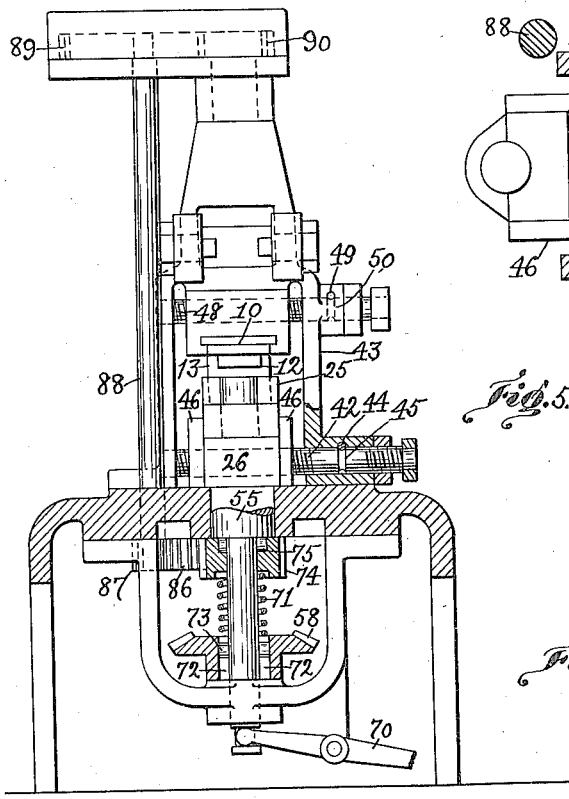

UNITED STATES PATENT OFFICE.

BICKNELL HALL, OF TAUNTON, MASSACHUSETTS, ASSIGNOR TO PANTHER RUBBER MANUFACTURING COMPANY, OF STOUGHTON, MASSACHUSETTS, A CORPORATION OF MASSACHUSETTS.

MACHINE FOR COVERING INNERSOLES OF THE GEM TYPE.

1,160,711.   Specification of Letters Patent.   Patented Nov. 16, 1915.

Application filed January 6, 1915. Serial No. 864.

*To all whom it may concern:*

Be it known that I, BICKNELL HALL, a citizen of the United States, residing in Taunton, in the county of Bristol and State of Massachusetts, have invented an Improvement in Machines for Covering Innersoles of the Gem Type, of which the following description, in connection with the accompanying drawings, is a specification, like characters on the drawings representing like parts.

This invention relates to a machine for pressing together layers of fibrous material, and is especially designed and adapted for use as a finishing machine for inner soles of the Gem type, which have had a canvas or other fibrous layer previously applied by hand or by the so-called Gem machine to a leather or other inner sole.

The invention has for its object to provide a machine with which the canvas layer is pressed into the angle formed by the lip and feather of the inner sole so as to produce a smoother and more finished inner sole.

The invention also has for its object to provide a machine in which the working tools are directly and positively driven, and in which they may be changed substantially in an instant, as will be described.

The invention further has for its object to provide a machine in which the lip may be supported on its outer side and prevented from being distorted or bent outwardly by the canvas as the latter is pressed into the angle formed by the lip and feather, as will be described.

Provision is made for limiting the forward movement of the lip supporting tool so as to avoid the canvas covering the lip from being held against movement under the influence of the pressing-in tool,—as will be described.

These and other features of the invention will be pointed out in the claims at the end of this specification.

Figure 1:
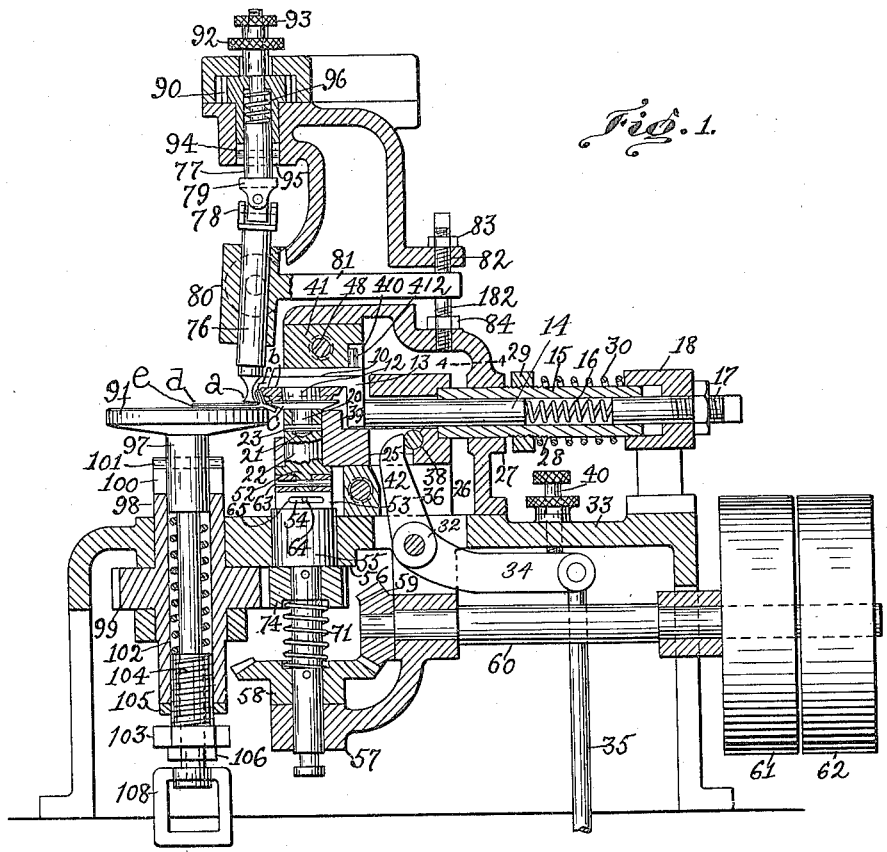
Figure 2:
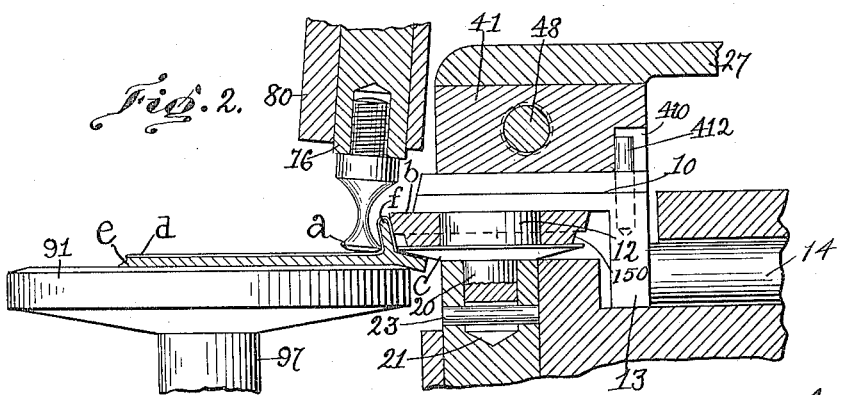

Figure 1 is a vertical section with parts in elevation of one form of machine embodying this invention. Fig. 2, an enlarged detail in section to show the operating tools. Fig. 3, a side elevation of the machine shown in Fig. 1 with parts in section, and Fig. 4, a detail in section taken on the line 4—4, Fig. 1. Fig. 5, a plan of the gearing between the inside and outside tools, and Fig. 6, a detail to illustrate the lateral adjustment of the tool $b$ with relation to the tool $a$.

The machine herein shown as embodying this invention is provided with two working tools, $a$ and $c$ which coöperate to firmly press a layer $d$ of cloth, canvas or other material, provided with a coating of adhesive material, and which has been previously applied to an inner sole $e$ of leather or other material, having a lip $f$, by hand or by the so-called Gem machine, and such as now commonly used in the manufacture of welted boots and shoes and is further provided with a backing tool or member $b$ for supporting the lip $f$, as will be described.

The tool $a$ is designed to work on the inner side of the lip $f$ and is suitably shaped to press the canvas into the angle formed by the inner surface of the lip and the upper surface of the inner sole.

The tool $c$ acts upon the canvas to press the same into the angle formed by the outer surface of the lip and the upper surface of the feather or body portion of the inner sole which is outside of the lip. These tools $a$, $c$, are positively driven or rotated and act as feed rolls to feed the inner sole.

The tool $b$ acts as an abutment, guide or backing member to limit the outward movement of the upper or free end of the lip and prevents the lip being moved outwardly beyond a predetermined position or angle with relation to the inner sole, which may be caused by the pressing-in tool $c$, drawing the canvas over the lip.

The tool $b$ is made as a disk or wheel and is loosely mounted to be turned freely by the lip as the inner sole is fed forward by the feed tools $a$, $c$.

The tools $b$, $c$, are independently movable toward and from the lip $f$ and the tool $a$.

In the present instance, I have illustrated one construction of mechanism by which the independent movements of the tools $b$, $c$, are obtained. To this end, the tools $b$, $c$, are provided with separate carriers, that for the tool $b$ being shown as a plate 10 provided on its under side with a stud 12, on which the tool $b$ is loosely mounted, and having an arm 13 against which abuts a stud or rod 14, which is slidably mounted in a tube or sleeve 15, forming part of the carrier for the tool $c$, as will be described. The rod 14 is engaged by a spring 16, located within the tube 15 and whose tension or strength can be adjusted by a screw 17, in threaded engagement with the end wall of a hollow boss 18, which forms a bearing for the outer end of the tube 15, and constitutes a part of the framework of the machine.

The tool $b$ is shown as a disk having a beveled circumference, and it rests upon the tool $c$, which is shown as a disk having a thin circumferential edge and a beveled or inclined under surface, from the center of which projects a stud 20, which extends into a socket 21 in the upper end of a spindle or shaft section 22, and is removably secured thereto by a pin 23, which is straddled by the end of the stud 20, which latter is slotted for this purpose in a manner well understood, and as a result, the tool $c$ can be disengaged from the shaft section 22, by lowering the latter away from the tool $c$. The shaft section 22 may be lowered as will be hereinafter described.

The shaft section 22 is mounted to turn in a carrier for the tool $c$ and its shaft section 22, said carrier being shown as a block or frame 25, which is mounted to slide on a second block 26, which in turn is mounted to slide on the framework of the machine in a direction substantially at right angles to that in which the block 25 slides. The block 25 has a transverse slot 125, see dotted lines Fig. 4, in its rear wall, into which is extended the tube or sleeve 15, which is mounted to slide in the hollow boss 18 and in an upright 27, which latter forms part of the framework of the machine. The tube 15 is provided with screw threads 28, which are engaged by a nut 29, between which and the hollow boss 18 is interposed a spring 30, which serves to move the carrier for the tool $c$ forward into its operative position, while the spring 16 serves to move the carrier for the tool $b$ forward into its operative position. It will thus be seen that the tools $b$, $c$ are independently movable toward the work by the springs 16, 30, whose tension or strength can be regulated by the set screw 17 and nut 29.

Provision is made for moving the carriers for the tools $b$, $c$, backward, and for this purpose an elbow lever 32 is pivoted to the framework 33, and has an arm 34 connected by a link or rod 35 with a foot treadle (not shown), and has a second arm 36 extended into a slot 37 in the block 25 and engaged with a cross pin 38, so that by depressing the foot treadle (not shown) the elbow lever is turned so as to cause its arm 36 to force the block 25 backward, which carries with it the carrier for the tool $b$, as soon as a vertical wall 39 on the block or frame 25 engages the arm 13 on the plate 10. The forward movement of the carrier for the tool $c$ is limited by a set screw 40, with which the arm 34 of the elbow lever 32 engages, and the forward movement of the carrier for the tool $b$ is limited, as will be described.

The plate 10 of the carrier for the tool $b$ is mounted to slide in a block 41, which is provided at its rear side with a transverse slot 410, see Fig. 2, into which extends a stud or pin 412 affixed to the plate 10 and which engages the front wall of the slot 410 to limit the forward movement of the plate 10 and the tool $b$ carried thereby. The block 26 upon which the carrier block 25 rests, is capable of being moved laterally or substantially at right angles to the path in which the carrier for the tool $c$ is moved, and for this purpose, a threaded rod 42 is extended through a threaded hole in the block 26 and mounted to turn in uprights 43 of the framework, and is restrained from longitudinal movement by a pin 44, extended into an annular groove 45 in said rod. The block 26 is provided with side pieces 46 between which the block 25 is located. (This lateral movement of the block 25 is permitted by the transverse slot 125 and by the slot 126 which latter is wider than the diameter of the rod 14 as indicated in Fig. 4.) Provision is also made for moving the block 41 laterally, and for this purpose, a threaded rod 48 is extended through a threaded hole in the block 41, and is mounted to turn in the uprights 43, but is restrained from longitudinal movement by a pin 49 extended into an annular groove 50 in said rod. The lateral movement of the block 41 is permitted by the arm 13 being disconnected from the rod 14. In this manner, the tools $b$, $c$, can be moved laterally with relation to the tool $a$ in opposite directions after the manner represented in Fig. 6.

Provision is made for positively or directly driving the tool $c$, and yet allow for the bodily movement of the same. To this end, the shaft section 22 is provided on its under surface with a tongue 52, which fits into a slot formed in the upper surface of a second shaft section 53, which in turn is provided on its under surface with a slot, not shown, but which runs at right angles to the tongue 52, and this latter slot receives a tongue 54, projecting from the upper surface of a third shaft section 55, which is journaled in bearings 56, 57 in the framework, and has secured to it a bevel gear 58, which meshes with a bevel pinion 59 on a main or driving shaft 60, provided with the usual fast and loose pulleys 61, 62.

The shaft sections 22, 53, 55, are connected together by pins 63, 64, so that the three sections may be rotated as one piece and be longitudinally movable as one piece, and said pins are extended through elongated slots, only one 65 of which is shown in Fig. 1, so as to permit the shaft sections 22, 53 to be moved laterally with relation to the section 55 to provide for the movements of the tool c above described.

The shaft sections 22, 53, 55, may be moved longitudinally in a downward direction, by a lever 70, see Fig. 3, and may be moved upwardly by a spring 71. In the present instance the bevel gear 58 is provided in its bore with substantially diametrically opposite slots 72, see Fig. 3, into which extend the ends of a pin 73 carried by the shaft section 55, and a gear 74 is secured to the shaft section 55 to rotate therewith by a pin 75. The tool a is detachably secured to a rotatable shaft, composed of two sections 76, 77, which are joined together by a universal joint or coupling composed of members 78, 79, which are arranged so as to permit the tool carrying section 76 to be moved so as to adjust the tool a toward and from the tools b, c. The shaft section 76 is mounted to turn in a bearing hub 80, pivotally mounted in the framework and forming part of a lever 81, which is capable of being turned on its pivots by adjusting set screws 82, 182, provided with lock nuts 83, 84. Rotation is imparted to the shaft section 76 by the upper shaft section 77 through the coupling 78, 79, and the shaft section 77 is driven from the main shaft 60 by the gears 59, 58, 74, which latter meshes with a large gear 86, which meshes with a pinion 87 on a shaft 88, see Figs. 3 and 5, which shaft has a large gear 89, which meshes with a gear 90, secured to the shaft section 77 to rotate therewith and to permit the shaft section to be moved longitudinally, when it is desired to adjust the tool a toward and from a support 91 for the inner sole.

The shaft section 77 has its upper end threaded to be engaged by an adjusting nut 92 and a lock nut 93, and is engaged with the gear 90 by a pin 94, which extends into diametrically opposite slots 95 in the hub of the gear 90. The shaft section 77 is forced downwardly by a helical spring 96 which encircles it within the hub of the gear 90. The work support 91 is shown as a disk fast on a spindle 97 which is extended into an elongated hub 98, having a bearing in the framework 33 and provided with a gear 99, which meshes with and is driven by the gear 74.

The hub 98 is provided at its upper end with substantially diametrical slots 100, into which project the ends of a pin 101, carried by the spindle 97, which is encircled within the hub by a helical spring 102, which serves to yieldingly support the work supporting table or disk 91, and whose tension is regulated by a nut 103, having a threaded hub 104 which engages the threaded lower end of the hub 98. The threaded hub 104 is locked in its adjusted position by the nut 105. The upward movement of the work support 91 is limited by a nut 106 on the spindle 97 engaging the nut 103, and the spindle 97 is provided with a link or swivel 108, by which the spindle 97 may be connected with a foot treadle (not shown) so that, the work support 91 can be lowered. The work table or disk 91 is held up into its operative position by the spring 102, and the upward movement of the table under the influence of said spring is limited by the nut 106 on the spindle 97 engaging the nut 103. Through the pin and slot connection 101, 100, the spindle 97 is rotated with the hub 98.

The spindle 97 and the link 35 may be connected with separate foot treadles, or they may be connected with one, so that, when the treadle is depressed, the work table 91 is lowered substantially at the same time the tools b, c, are moved backward and with these parts in the position just described, the covered inner sole may be placed on the table in position to be engaged on the inner side of the lip by the tool a, when the pressure is removed from the foot treadle and the table is elevated into its working position. When the table is in its working position, the operator manipulates the inner sole, so that the inner surface of the covered inner sole is engaged with the tool a, before the tools b, c, are engaged with the outer surface of the covered lip. The machine is then set in motion, and the tools a, c, are rotated to feed the covered inner sole, which is guided by the operator. The tools a, c, not only press the gummed covering down on the body of the inner sole and on the feather but also press the covering against the opposite sides of the lip f at the base of the same, and the tool a forces the canvas covering into the angle formed by the inner side of the lip with the inner sole, and the tool c presses the canvas covering into the angle formed by the outside of the lip with the feather of the inner sole, and the tools a, b, are so constructed or arranged as to permit the canvas covering the lip to be moved over the lip f by the pressing-in tool c, which draws the more or less loose material enveloping the lip over the upper edge of the lip, which latter is prevented from being moved outwardly or laterally with relation to the tool a and thereby distorted, by means of the tool b, which is employed as an abutment or backing member to support the upper portion of the lip on its outer side.

By reference to Fig. 2, it will be seen that the tool a is so shaped as not to engage the upper portion of the lip, and consequently the covering thereon is free to respond to the pressing-in action of the tool c which draws the surplus canvas over the lip and past the backing tool b without distortion of the lip. To facilitate movement of the canvas covering over the lip, the tool b may and preferably will have its lower portion 150 made of smaller diameter so as to reduce the frictional contact between the tool *b* and the canvas covering on the outside of the lip. In this manner the somewhat loose material enveloping the lip is caused to adhere to it firmly and smoothly and at the same time, the portions of the canvas cemented to the inner sole on opposite sides of the lip are still further pressed into firm engagement with the inner sole and a more finished inner sole of the Gem type is thus produced.

It will be observed that the tools *a*, *c*, are positively or directly driven, without interfering with the bodily movement of the same.

I have herein shown one construction of apparatus embodying this invention, but it is not desired to limit the invention to the particular construction shown.

Claims—

1. In a machine of the character described, in combination, a tool capable of engaging the covering on the inner side of the lip of an inner sole of the Gem type, and a plurality of tools capable of engaging the covering on the outer side of said lip, carriers for said last mentioned tools movable independently toward and from the first mentioned tool, springs acting on said carriers to move the latter independently of each other toward the first mentioned tool, and means for limiting the movement of one of said tools toward the first mentioned tool.

2. In a machine of the character described, in combination, a rotatable shaft vertically arranged and provided at its upper end with a socket, a tool having a stud inserted into said socket, means for connecting said tool with said shaft to rotate therewith and to permit said tool to be withdrawn from its socket substantially in an instant, and a bearing for said shaft with which said tool is engaged by downward movement of said shaft to effect removal of said stud from its socket, substantially as described.

3. In a machine of the character described, in combination, a rotatable tool to engage the inner side of the lip, a positively rotated pressure tool to engage the outside of the lip near the base thereof and press the covering on the lip into the angle formed by the lip and feather of the inner sole, means to positively rotate said tools and effect feed of the inner sole, and a loosely mounted disk or wheel located above the combined feeding and pressing-in tool and engaging the upper portion of the lip on the outer side thereof.

4. In a machine of the character described, in combination, a work support, a tool located above the work support, a shaft section to which said tool is secured, means for rotating said shaft section, a pivoted bearing for said shaft section, means for moving said bearing on its pivot to adjust said tool, and means for securing said pivoted bearing in its adjusted position and in fixed position with relation to said work-support, substantially as described.

5. In a machine of the class described, in combination, a rotatable tool to engage the inside of the lip of an insole at the base thereof and to leave the upper portion of said lip free, a second independent rotatable pressure tool to engage the outside of the lip near the base of the latter and coöperating with the first-mentioned rotatable tool to feed the insole, means for positively rotating said tools, and a backing member to engage the upper portion of said lip on the outer side thereof.

6. In a machine of the class described, in combination, a tool to engage the inside of the lip and movable laterally with relation thereto, a second tool to engage the outside of the lip at the upper portion thereof, and a third tool to engage the outside of the lip between the second mentioned tool and top of the sole, all of said tools being independently adjustable.

7. In a machine of the class described, in combination, a tool to engage the inside of the lip and movable laterally with relation thereto, a second tool to engage the outside of the lip at the upper portion thereof, and a third tool to engage the outside of the lip between the second tool and top of sole, all of said tools having independent pressure adjustment and means for adjusting the pressure of each of said tools independently of the other tools.

8. In a machine of the class described, in combination, an inside tool to coöperate with the inner surface of the lip of an inner sole, an outside tool to coöperate with the outer surface of said lip, a vertical shaft to drive said outside tool normally in alinement with the latter; means interposed between said outside tool and said vertical shaft whereby the axis of said tool may be adjusted out of alinement with the axis of said shaft without interfering with the uniform motion of said outside tool.

9. In a machine of the class described, in combination, an inside tool to coöperate with the inner surface of the lip of an inner sole, a shaft carrying said tool, an adjustable bearing for said shaft, a second shaft substantially in alinement with said tool and its shaft, a fixed bearing for said second shaft, said adjustable bearing permitting the tool-carrying shaft to be moved into and out of alinement with the shaft in said fixed bearing, means for securing said adjustable bearing in a stationary position, and means between the adjacent ends of said shafts for coupling them together and enabling the said tool to be driven at a uniform speed whether the axes of said shafts coincide or not.

10. In a machine of the class described, in combination, an inside tool $a$ to coöperate with the inner surface of the lip of an inner sole and carried in an adjustable bearing 80, and driven by a shaft 77 through the flexible coupling 79, an outside tool $b$ carried by an adjustable bearing 10, and coöperating with the outer surface of the lip of the inner sole to form a backing member therefor, an outside rotatable pressure tool $c$ carried by an adjustable bearing 25, and a driving shaft 55 for the tool $c$ connected with the latter by a flexible coupling 53 to permit the tool $c$ to be moved laterally with relation to the shaft 55.

In testimony whereof, I have signed my name to this specification in the presence of two subscribing witnesses.

BICKNELL HALL.

Witnesses:
JAS. H. CHURCHILL,
J. MURPHY.

Copies of this patent may be obtained for five cents each, by addressing the "Commissioner of Patents, Washington, D. C."